(12) United States Patent
Tervo et al.

(10) Patent No.: US 6,341,510 B1
(45) Date of Patent: Jan. 29, 2002

(54) LOCKING DEVICE FOR COMPUTER

(75) Inventors: Janne Tervo; Kim Vaisanen, both of Joensuu (FI)

(73) Assignee: Top-Cousins Oy (FI)

( * ) Notice: Subject to any disclaimer, the term of this patent is extended or adjusted under 35 U.S.C. 154(b) by 0 days.

(21) Appl. No.: 09/600,435

(22) PCT Filed: Jan. 14, 1999

(86) PCT No.: PCT/FI99/00020
§ 371 Date: Aug. 9, 2000
§ 102(e) Date: Aug. 9, 2000

(87) PCT Pub. No.: WO99/36996
PCT Pub. Date: Jul. 22, 1999

(30) Foreign Application Priority Data

Jan. 15, 1998 (FI) .................................................. 980066

(51) Int. Cl.[7] .............................................. E05B 69/00
(52) U.S. Cl. .............................. 70/58; 70/57; 70/168; 439/304
(58) Field of Search ................................ 70/57, 58, 63, 70/158–168; 439/371, 133, 942, 367, 304; 361/827, 826, 829

(56) References Cited

U.S. PATENT DOCUMENTS

| | | | |
|---|---|---|---|
| 4,898,009 A | | 2/1990 | Lakoski et al. |
| 5,169,332 A | * | 12/1992 | Cooke et al. ................ 439/304 |
| 5,190,465 A | * | 3/1993 | Davidge et al. ............. 70/57 X |
| 5,220,815 A | * | 6/1993 | Davidge et al. ............. 70/57 X |
| 5,398,530 A | | 3/1995 | Derman |
| 5,709,110 A | | 1/1998 | Greenfield et al. |
| 5,810,461 A | * | 9/1998 | Ive et al. ................ 439/942 X |
| 5,816,081 A | * | 10/1998 | Johnston ......................... 70/58 |
| 5,837,942 A | * | 11/1998 | Becker .................... 174/138 F |
| 5,868,014 A | * | 2/1999 | Lee ................................ 70/58 |
| 5,914,461 A | * | 6/1999 | Brandt ...................... 70/58 X |
| 5,925,128 A | * | 7/1999 | Harmon ..................... 713/200 |
| 5,960,651 A | * | 10/1999 | Tanisawa ................... 70/58 X |

FOREIGN PATENT DOCUMENTS

WO    PCT/US84/01758    5/1986

* cited by examiner

Primary Examiner—Suzanne Dino Barrett
(74) Attorney, Agent, or Firm—Skinner & Associates (57) ABSTRACT

A locking device for computers and especially for locking the cables of a computer and/or the cables of its peripheral devices, which locking device consists of an attachable frame, which is attached either to a computer or to a peripheral device, and attachable and detachable cover part, and a lock device by which the cover part is locked to the frame. A locking device according to the invention is equipped with formed fixing devices in the frame and/or in the cover part by which the cables connected to the computer are attached when the cover part has been attached to the frame.

24 Claims, 6 Drawing Sheets

LOCKING DEVICE FOR COMPUTER

The invention relates to a locking device for computers and especially for locking the cables of a computer and/or its peripheral devices to the computer, which locking device consists of a frame which is attached either to the computer or to a peripheral device, a cover part which is attached to the frame and is also detached from it, and a locking device which locks the cover part to the frame.

A computer usually consists of a central processing unit which is connected through cables, or through corresponding parts, to different peripheral devices like a display unit, printer or other equipment. An everyday problem is that computers and peripheral devices are often relatively light and they can be moved by carrying. The cables are easy to detach from a computer and peripheral devices, thus the computer and/or the peripheral devices can be easily moved one by one from a place to another. Safeguarding the computers and peripheral devices against theft has to be taken into account in places where there may be a lot of people passing by.

There are diverse locking devices by which a computer or peripheral devices can be locked to a table or a corresponding foundation or to each other. The structure of these devices is clumsy and they are difficult to use. Usually every single equipment has to be attached separately to a foundation or a corresponding structure.

The object of this invention is to present a locking device for computers, which prevents stealing the computer or its peripheral devices. In addition the object of the invention is to present a locking device which has a simple structure, it is easy to use and its manufacturing costs are advantageous. In addition the meaning of this invention is to present a locking device which can be adjusted according to different computers and/or their peripheral devices.

The object of the invention is achieved through a locking device which is characterized by the details described in the claims.

A locking device according to the invention is equipped with formed fixing devices in the frame and/or in the cover part by which the cables connected to the computer are attached when the cover part has been attached to the frame. The cables are attached by using the locking device by attaching the device first to the computer frame, frame of peripheral device or some other appropriate place in these equipment, and by attaching the cables from the computer or the peripheral device to the locking device. After the cables have been attached to the computer and its peripheral devices it is difficult to detach them and it requires strong measures including breaking the locking device. It is difficult to move the computer and its peripheral devices simultaneously, thus it is difficult to steal the set. It is also possible to attach one of the locking devices to a foundation, like a table or a corresponding structure, and in this case it is almost impossible to steal the set.

The advantageous embodiment of the invention includes fixing devices that have been formed to the upper surface of the frame. By using these fixing devices the cables are attached to the locking device. By using the fixing devices it is possible to attach the cables between the frame and the cover part. The fixing devices are designed in a functional way so that the cables are firmly attached in their position.

In the other advantageous embodiment of the invention the fixing devices have been formed to the lower surface of the cover part and they are used to attach the cables to the locking device. Also in this case the appropriately designed fixing devices are used for attaching the cables firmly between the cover part and the frame.

In the additional advantageous embodiment of the invention the fixing devices have been formed to the upper surface of the frame and the corresponding fixing devices have been formed to the lower surface of the cover part in order to attach the cover part to the frame. These fixing devices help the lock device and attach the cover part firmly to the frame. The structure and form of the fixing devices may vary in different embodiments in an appropriate way.

Mainly hollow supports have been formed to the ends of the frame in the advantageous additional embodiment of the invention. These supports have been equipped with disc-like devices which can be turned and adjusted according to the supports. These discs contain one or more eccentric holes for attachment of the frame. When the locking device is attached to a computer or a peripheral device the discs and the holes enable effective adjustment of locking points to the desired part of the computer or the peripheral device. The discs can be turned to different positions till some of the holes matches the appropriate place in the structure. After this the frame can be attached through this hole by using a fixing screw, or a corresponding one, to the computer or its peripheral device.

In the following the invention is explained in a more detailed way by referring to the accompanying drawings.

A locking device corresponding the FIGS. 1–6 consists of a frame 3 including the cover part 4 which can be attached to the frame and a lock device 5. The parts of the locking device have been manufactured of appropriate materials, like plastic, metal or other material.

Projections have been formed to the upper surface of the frame 3 and reach upwards. These projections are fixing devices 6. There are spaces between the projections and they are formed in a way that the cables related to the computer fit between them. In these embodiments the surface of the cover part act as the opposite fixing device but in some embodiments it is possible to make separate fixing devices for the cover part in addition to or instead of the fixing devices of the cover part.

Figure 1:
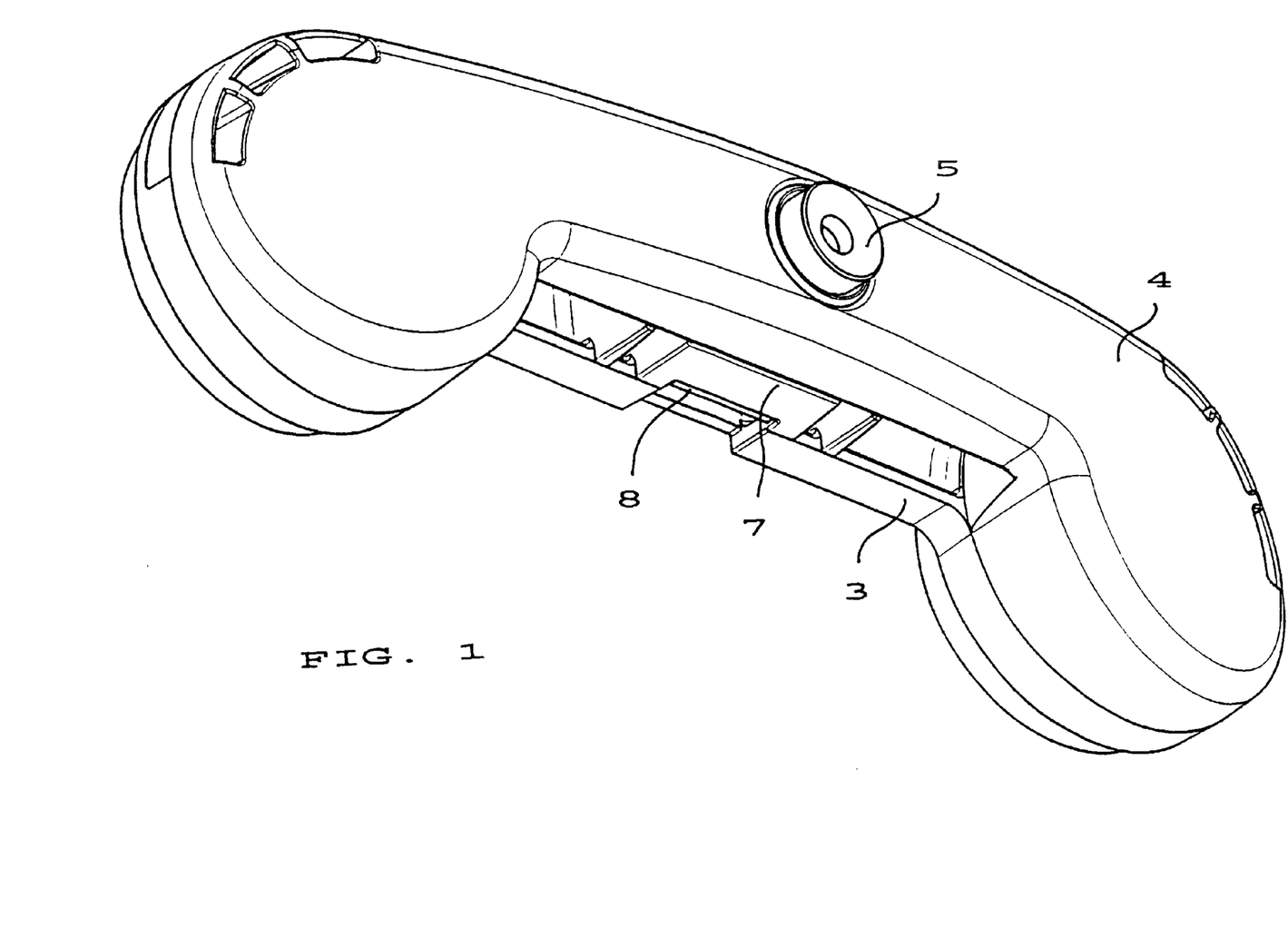
FIG. 1 illustrates one embodiment of the locking device according to the invention as it is seen diagonally from the side.
Figure 2:
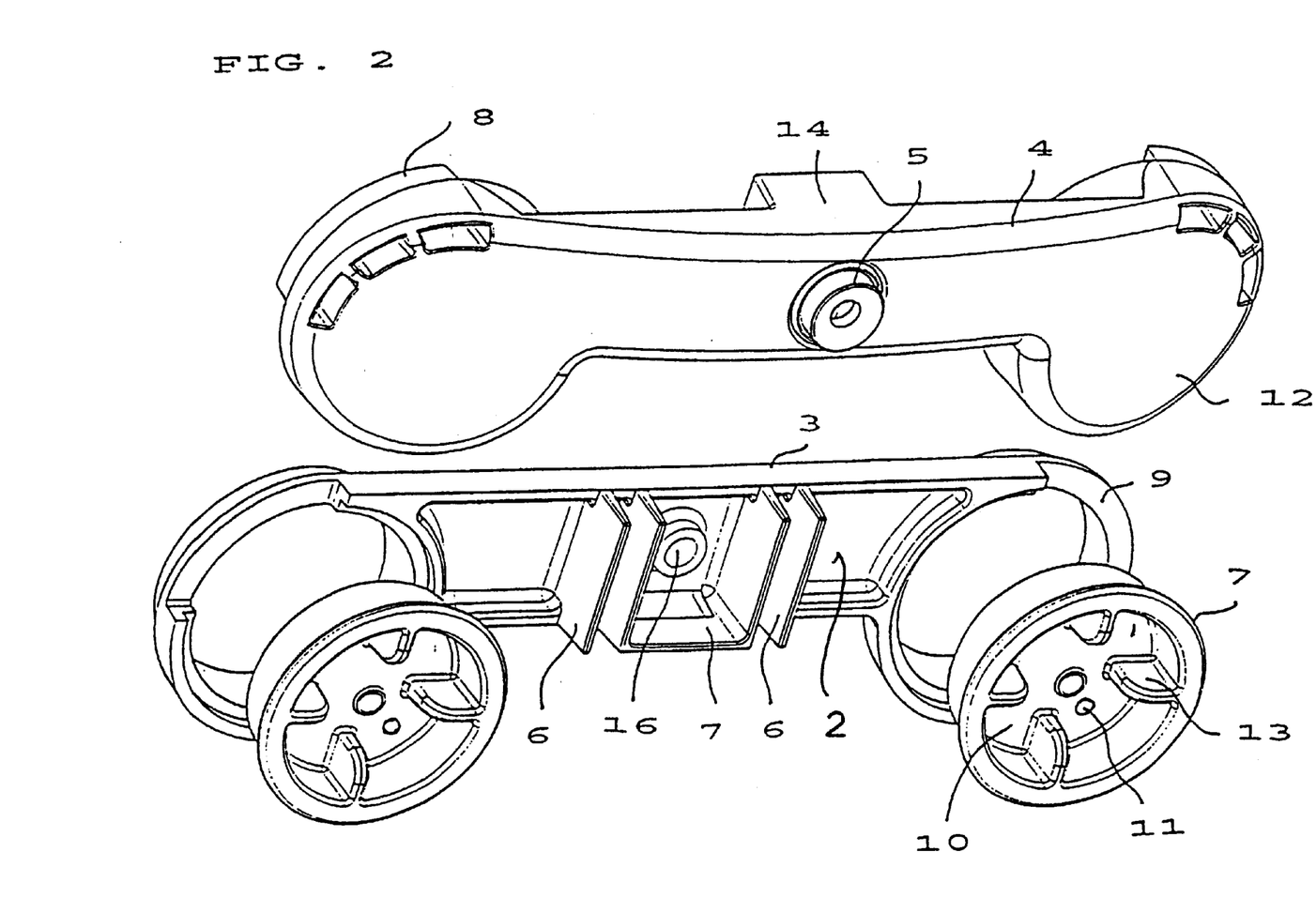
FIG. 2 illustrates a locking device corresponding the FIG. 1 and its parts as an exploded drawing as it is seen diagonally from above.
Figure 3:
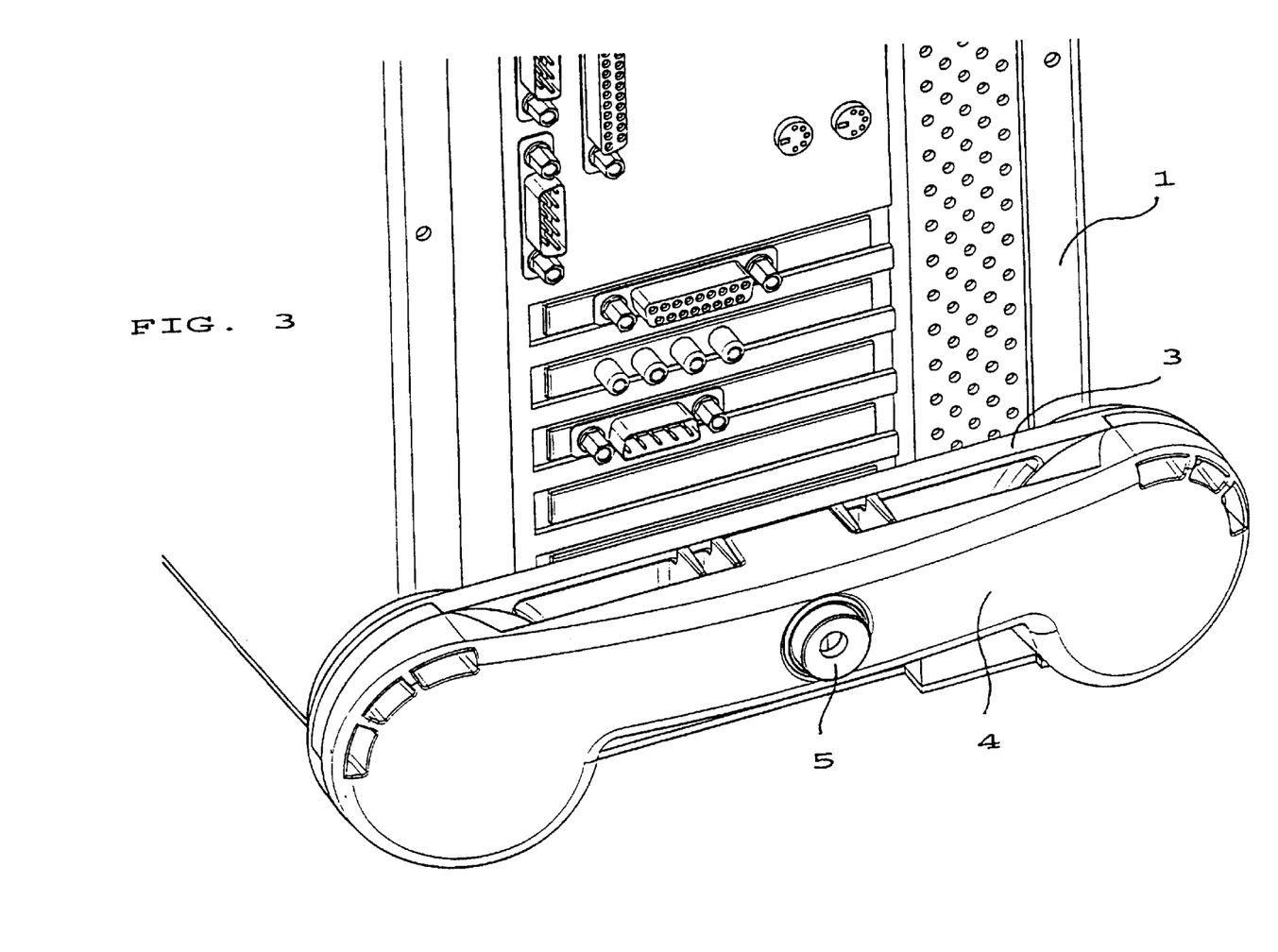
FIG. 3 illustrates a locking device corresponding the FIG. 1 attached to the computer.

In the embodiment corresponding the FIGS. 1–3 there are cross-sectional circular hollow supports 9 in the both ends of the frame and these supports have been equipped with edgings. Furthermore the locking device includes a discoidal holding blocks 10 that can be placed to the supports; these holding blocks have been placed on the edging of the supports and they can be rotated. Several holes 11 for the fixing screws have been formed eccentrically to the discs 10. There are two holes in this embodiment, but the number of holes may vary in different embodiments and there may be one or more holes. The holes are located radially in different parts of the discs. The discs 10 can be placed on the corresponding surfaces located in the supports 9 and they can be turned easily to different positions, compared with the frame part, by using the projections 13 of the discs.

The shape of the cover part 4 corresponds the frame and there are circular parts 12 in its ends, which parts extend on the supports 9 of the frame 3 when the cover part is locked to the frame. Thus the fixing screws cannot be opened when the cover part has been locked to the frame.

The cover part 4 includes also a projection 14 placed to its central part; a hole 15 for the lock device 5 has been formed to it. A surface or a corresponding one has been formed to the corresponding point of the frame and the projection of the cover part can be placed towards it, and there is also a hole 16 for the lock device. A projection-like part 8 has been attached to the projection and this part sticks out from the projection. In the frame part there is a girder-like part 7 between the inner fixing devices 6. A hole, into which the projection-like part 8 of the projection 14 in the cover part can be installed, is located between the girder-like part and the edge of the frame part. These parts 7, 8 act as fixing parts between the frame part and the cover part. Another fixing parts are the projection-like parts 8, which reach inwards, and are formed to the circular parts 12 in the ends of the cover part and the corresponding projections 7 formed to the disc-like parts 10.

In an other embodiment of the invention the locking devices are projections, which have been attached to the frame part and the cover part, and locate diagonally in relation to these. These diagonally located locking devices guarantee excellent locking and the frame part and the cover part cannot in any case move to another direction; they cannot move even though the lock device is open.

When a locking device corresponding the FIGS. 1–3 is used it is attached according to the FIG. 3 to the computer 1 or its peripheral device by placing it to an appropriate place in the computer frame. The position can be adjusted by turning the discs of the frame part to an appropriate point. The discs lock the frame in its place in the computer when the discs are attached to the computer or its peripheral device for example by using fixing screws. Next the cables are attached to the frame of the locking device. When the cables are installed to the right place, the cover part of the locking device is attached to its place by placing it so that the middle parts and the ends match. The locking device is pressed through the holes and the device is locked. The ends of the cover part reach above the supports of the frame and prevent opening of the fixing screws. The lock device in use is an ordinary lock device, which can be locked by pressing the lock cylinder down so that it reaches from the cover part through the hole in the frame to the other side.

Figure 4:
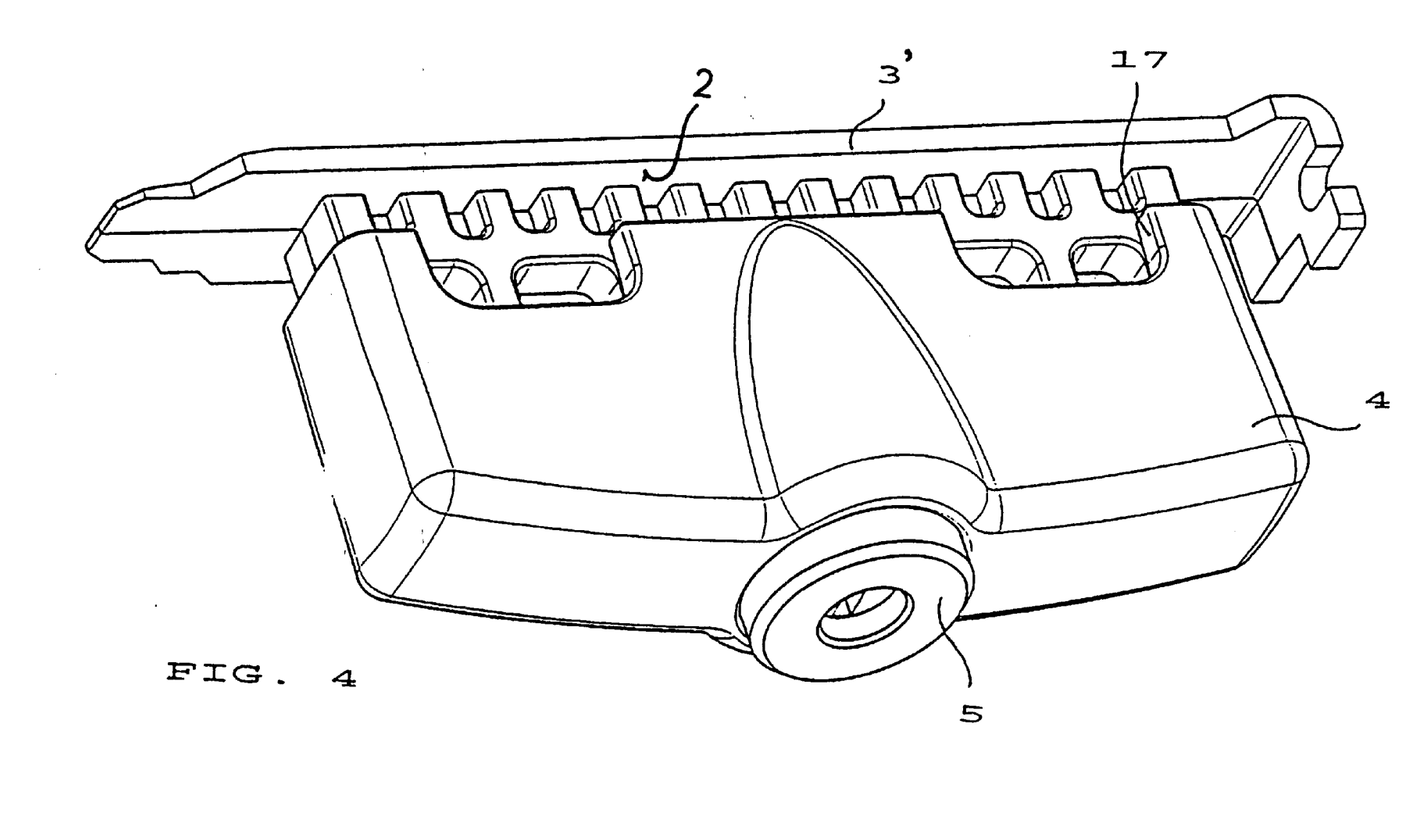
FIG. 4 illustrates another embodiment of a locking device according to the invention as it is seen diagonally from the side.
Figure 5:
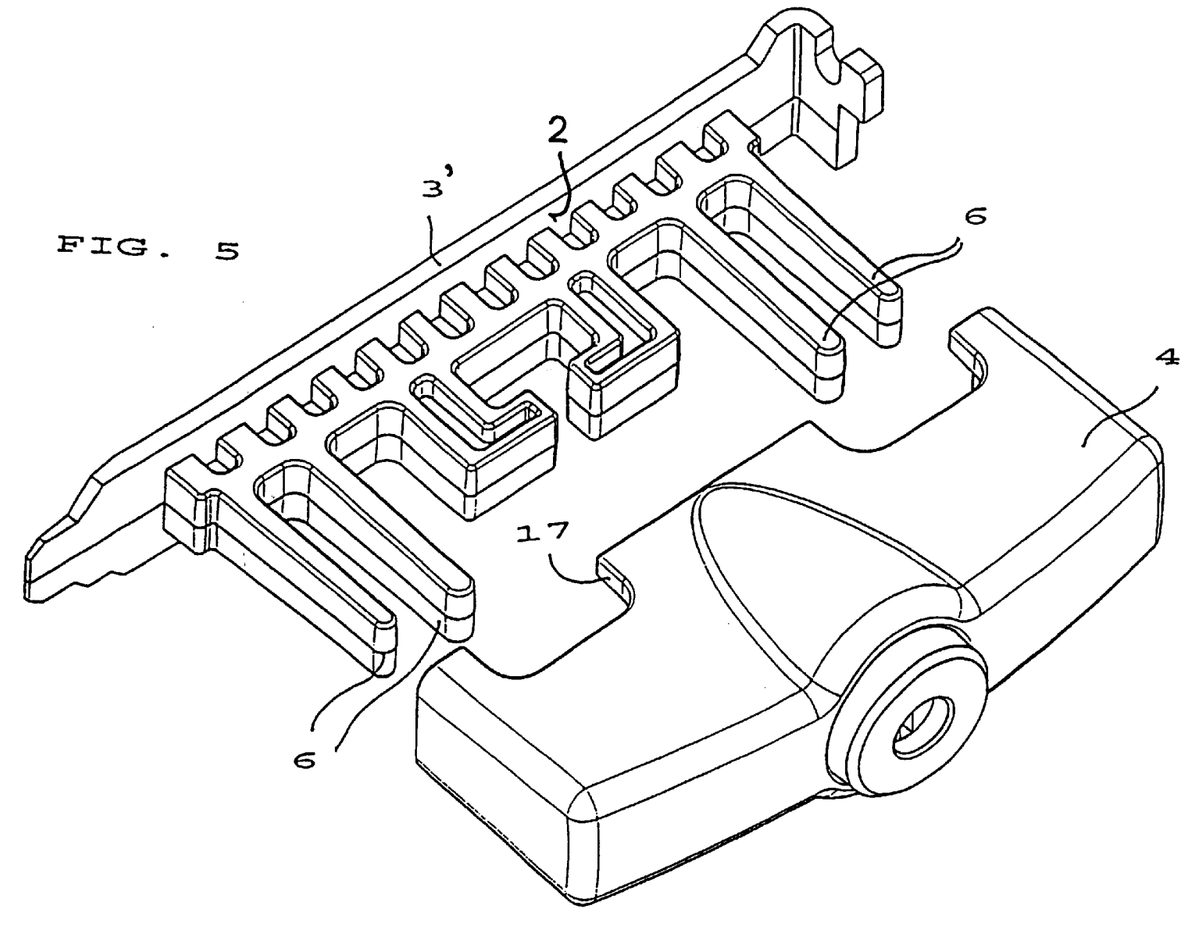
FIG. 5 illustrates the locking device and its parts corresponding the FIG. 4 as an exploded drawing seen diagonally from the side.
Figure 6:
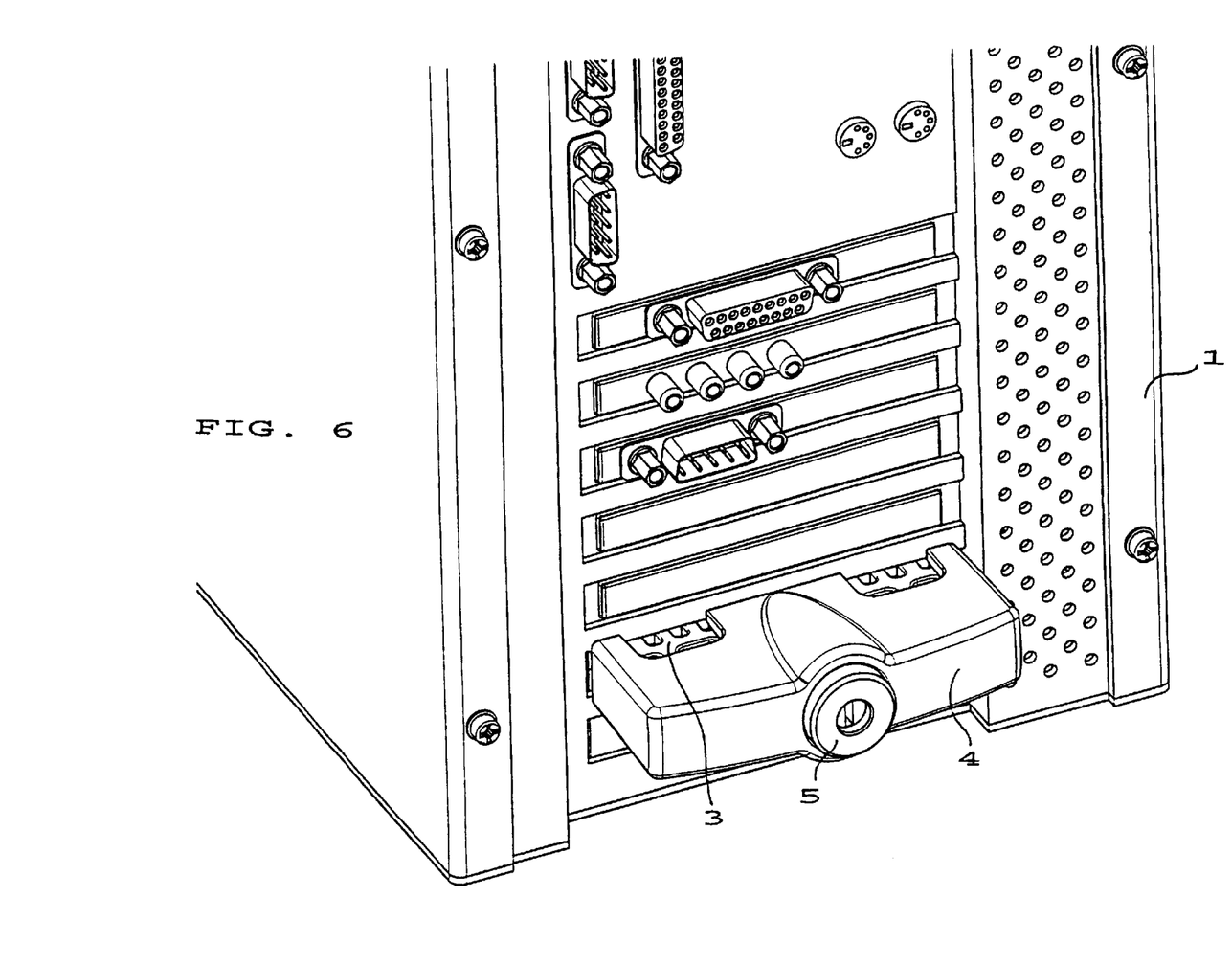
FIG. 6 illustrates an embodiment corresponding the FIG. 4 attached to the computer.

In an embodiment corresponding the FIGS. 4–6 there are several projecting fixing devices 6 in the frame part of the locking device. The cover part 4 is case-like and it is equipped with notches 17 on the both sides including a hole in the middle for the lock device 5. This embodiment is intended to be attached to the expansion slot. The operating principle is similar to the earlier introduced embodiment even though the details of the structure are different. The locking device is used by attaching its frame part 3 to the expansion slot and the cables are placed between the fixing devices. Next the cover part 4 is pressed against the frame part 3 and the cover part is locked. Thus the notches 17 match the fixing devices and the cables are locked between the frame part and the cover part.

The invention is not limited to the described advantageous embodiments, but it may vary within the inventive idea formed by the claims.

What is claimed is:

1. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the frame (3, 3') being provided with attachment devices (7, 11; 3') for said attachment to the computer or peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, said locking arrangement further characterized in that the fixing devices (6) for attaching the cables have been formed to the upper surface (2) of the frame (3, 3'), said upper surface (2) facing the cover part (4), or the fixing devices have been formed to the lower surface of the cover part (4), said lower surface facing the frame (3, 3'), a part of the locking device (5, 7) has been formed to the upper surface (2) of the frame (3, 3') and that there are matching locking devices (8) formed to the lower surface of the cover part (4) by which the cover part is attached to the frame, and that hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

2. A locking device according to claim 1, wherein the ends (12) of the cover part (4) reach and match the ends of the frame, and the ends of the cover part have been organized to cover the supports (9) of the frame when the cover part is locked to the frame.

3. A locking device according to claim 1, wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

4. A locking device according to claim 3, wherein the ends (12) of the cover part (4) reach and match the ends of the frame, and the ends of the cover part have been organized to cover the supports (9) of the frame when the cover part is locked to the frame.

5. A locking device according to claim 1, wherein a part of the locking device (5, 7) has been formed to the upper surface (2) of the frame (3, 3') and that there are matching locking devices (8) formed to the lower surface of the cover part (4) by which the cover part is attached to the frame.

6. A locking device according to claim 5, wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

7. A locking device according to claim 6, wherein the ends (12) of the cover part (4) reach and match the ends of the frame, and the ends of the cover part have been organized to cover the supports (9) of the frame when the cover part is locked to the frame.

8. A locking device according to claim 1, wherein hollow supports (9) have been formed to the ends of the frame (3)

and the supports have been equipped with discs (10) which have been placed in a way that they can be turned and adjusted and that one or more holes (11) have been formed eccentrically to the discs for fixing screws or the like.

9. A locking device according to claim 8, wherein the ends (12) of the cover part (4) reach and match the ends of the frame, and the ends of the cover part have been organized to cover the supports (9) of the frame when the cover part is locked to the frame.

10. A locking arrangement according to claim 1, wherein the fixing devices for attaching the cables have been formed to the lower surface of the cover part (4), said lower surface facing the frame (3, 3').

11. A locking device according to claim 10, characterized in that a part of the locking device (5, 7) has been formed to the upper surface (2) of the frame (3, 3') and that there are matching locking devices (8) formed to the lower surface of the cover part (4) by which the cover part is attached to the frame.

12. A locking device according to claim 11, wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

13. A locking device according to claim 12, wherein the ends (12) of the cover part (4) reach and match the ends of the frame, and the ends of the cover part have been organized to cover the supports (9) of the frame when the cover part is locked to the frame.

14. A locking device according to claim 1, wherein a part of the locking device (5, 7) has been formed to the upper surface (2) of the frame (3, 3') and that there are matching locking devices (8) formed to the lower surface of the cover part (4) by which the cover part is attached to the frame.

15. A locking device according to claim 14, wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

16. A locking device according to claim 15, wherein the ends (12) of the cover part (4) reach and match the ends of the frame, and the ends of the cover part have been organized to cover the supports (9) of the frame when the cover part is locked to the frame.

17. A locking device according to claim 1, wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

18. A locking device according to claim 17, wherein the ends (12) of the cover part (4) reach and match the ends of the frame, and the ends of the cover part have been organized to cover the supports (9) of the frame when the cover part is locked to the frame.

19. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the fixing devices having been formed to the upper surface (2) of the cover part (4), said upper surface (2) facing the cover part (4), or the fixing devices having been formed in the lower surface of the cover part (4), said lower surface facing the frame (3,3'), the frame (3, 3') being provided with attachment devices (7, 11; 3') for said attachment to the computer or peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, and further wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

20. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the fixing devices having been formed to the upper surface (2) of the frame (3,3'), said upper surface (2) facing the cover part (4), the frame (3, 3') being provided with attachment devices (7, 11; 3') for said attachment to the computer or peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, and further wherein a part of the locking device (5, 7) has been formed to the upper surface (2) of the frame (3, 3') and that there are matching locking devices (8) formed to the lower surface of the cover part (4) by which the cover part is attached to the frame and that hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

21. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the fixing devices having been formed to the upper surface (2) of the frame (3,3'), said upper surface (2) facing the cover part (4), the frame (3, 3') being provided with attachment devices (7, 11; 3') for said attachment to the computer or its peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, and further wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

22. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the fixing devices having been formed to the lower surface of the cover part (4), said lower surface facing the frame (3,3'), the frame (3, 3') being provided with attachment devices (7, 11; 3') for said attachment to the computer or peripheral device, wherein attachment devices include either holes (11) having variable distance or a frame (3') designed for attachment to an expansion slot of the computer, the position of the attached locking arrangement being adjacent but not covering the cable connectors, and that the cover part (4) is case like, and further wherein a part of the locking device (5, 7) has been formed to the upper surface (2) of the frame (3, 3') and that there are matching locking devices (8) formed to the lower surface of the cover part (4) by which the cover part is attached to the frame, and that hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

23. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the frame (3, 3') being provided with attachment devices (7, 11; 3') for said attachment to the computer or peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, and further wherein a part of the locking device (5, 7) has been formed to the upper surface (2) of the frame (3, 3') and that there are matching locking devices (8) formed to the lower surface of the cover part (4) by which the cover part is attached to the frame, and that hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

24. A locking arrangement for computers and especially for locking the cables of the computer (1) and/or the cables of peripheral devices, which locking arrangement consists of a frame (3, 3') for attachment to the computer or peripheral device, a cover part (4) for attachment to and detachment from the frame, and a locking device (5, 7) for locking the cover part to the frame, the frame and/or the cover part including fixing devices (6) for attaching the cables connected to a computer to the locking arrangement when the cover part has been attached to the frame, the frame (3, 3') being provided with attachment devices (7, 11; 3') for said attachment to the computer or peripheral device, wherein the attachment devices include either holes (11) having variable distance or a frame (3') designed for attachment to an expansion slot of the computer, the position of the attached locking arrangement being adjacent but not covering the cable connectors, and that the cover part (4) is case like, and further wherein hollow supports (9) have been formed to the ends of the frame (3) and the supports have been equipped with discs (10) which have been placed in a way that they can be turned and adjusted and that one or more holes (11) have been formed eccentrically to the discs for fixing screws or the like.

\* \* \* \* \*